United States Patent [19]

Leiber

[11] Patent Number: 4,704,541

[45] Date of Patent: Nov. 3, 1987

[54] PROPULSION CONTROL SYSTEM FOR MOTOR VEHICLES

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 943,784

[22] Filed: Dec. 19, 1986

[30] Foreign Application Priority Data

Dec. 21, 1985 [DE] Fed. Rep. of Germany ....... 3545543

[51] Int. Cl.$^4$ .............................................. B60K 9/00
[52] U.S. Cl. .................................... 307/9; 307/10 R; 180/142; 180/197; 123/361
[58] Field of Search ........................ 307/9, 10 R, 120; 180/147, 172, 170, 178, 179, 181 R, 142, 143; 123/319, 320, 350, 361, 370, 371, 324, 399, 352; 364/426, 431.07; 340/52 R, 53

[56] References Cited

U.S. PATENT DOCUMENTS

| 3,719,246 | 3/1973 | Bott | 180/197 |
|---|---|---|---|
| 3,897,846 | 8/1975 | Inoue | 180/142 |
| 3,997,019 | 12/1976 | Inoue | 180/172 |
| 4,282,947 | 8/1981 | Kemper | 364/426 X |
| 4,412,594 | 11/1983 | Furukawa et al. | 180/142 X |
| 4,476,954 | 10/1984 | Johnson et al. | 364/426 X |
| 4,520,777 | 6/1985 | Hatori et al. | 180/142 X |
| 4,569,239 | 2/1986 | Shirley et al. | 180/179 X |
| 4,593,358 | 6/1986 | Takeshima et al. | 180/142 X |

FOREIGN PATENT DOCUMENTS 1902944  8/1970  Fed. Rep. of Germany .

Primary Examiner—William M. Shoop, Jr.
Assistant Examiner—Shik Luen Paul Ip
Attorney, Agent, or Firm—Barnes & Thornburg

[57] ABSTRACT

A propulsion control system for motor vehicles in the range of the cornering limit speed, having a memory in which the momentary steering angle value is stored when a certain steering angle change is not followed by a change of the lateral acceleration, having threshold value comparators in which the actual steering angle is compared with threshold values that depend on the stored steering angle value, and having logic for transmitting and stop transmitting a signal to a control element for the power reduction of the vehicle engine when the actual steering angle exceeds one threshold value and then falls below the other threshold value. The steering angle may also be replaced by the driving speed or by a combination of both quantities.

8 Claims, 1 Drawing Figure

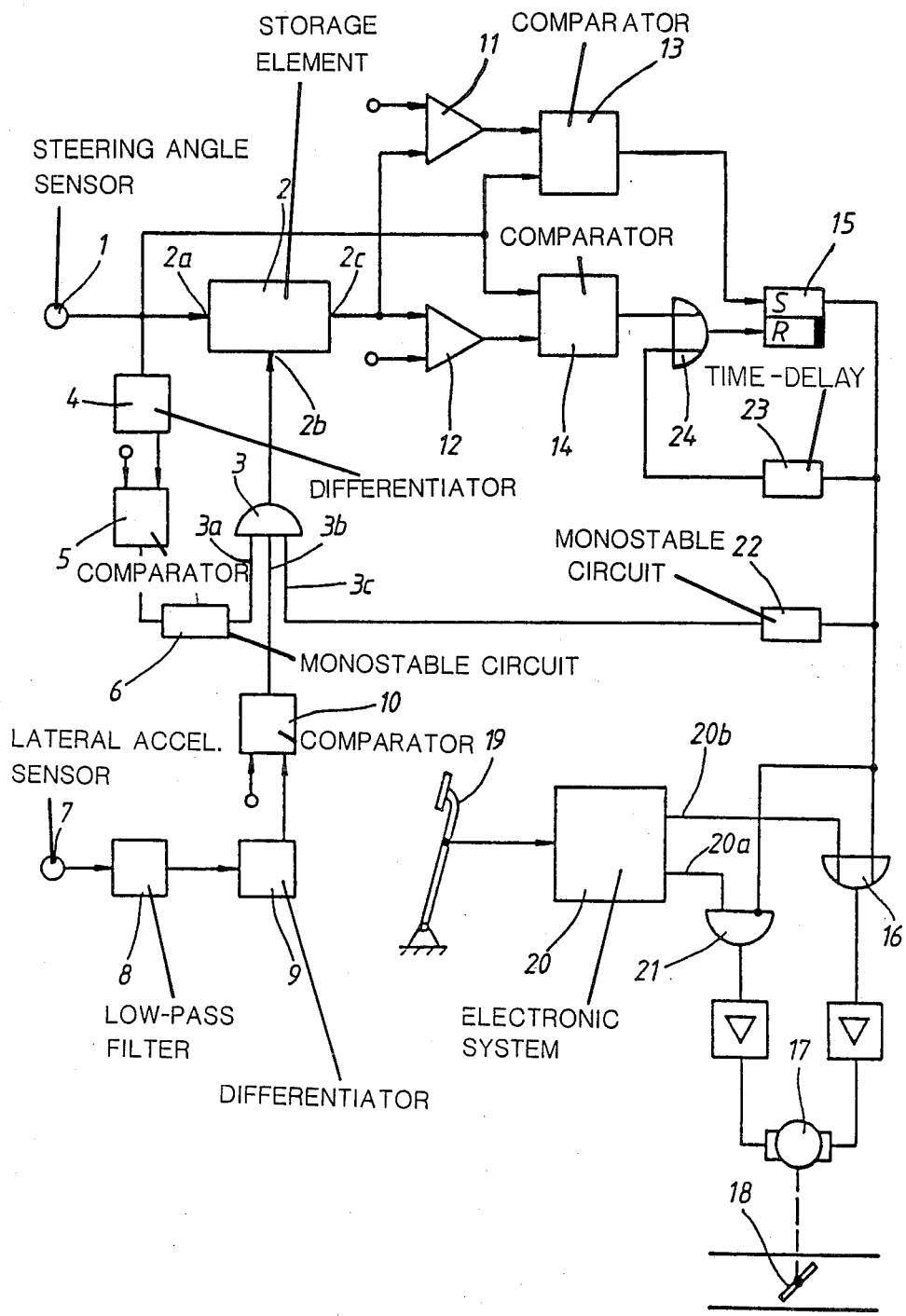

PROPULSION CONTROL SYSTEM FOR MOTOR VEHICLES

BACKGROUND AND SUMMARY OF THE INVENTION

The invention relates to a propulsion control system for motor vehicles according to the type shown in DE-PS No. 19 02 944.

The driving stability of a vehicle can be considerably better if it is equipped with a wheel slip control. However, the driving stability is lost when, for example, the cornering limit speed is exceeded. If the gas pedal is not taken back in time, the vehicle becomes unstable.

The arrangement according to DE-PS No. 19 02 944 is a control arrangement for avoiding skidding in turns in the case of motor vehicles. A plurality of measured and calculated quantities are obtained, from gyroscope and several sensors, and provide, in a way that is not shown, control signals for the brake system as well as for a power control element of the internal-combustion engine. In this case, three programs for the varying road conditions are provided that are to be selected by the driver.

This type of system is not satisfactory from the point of view of manufacturing technology because it is much too costly, nor with a view to application. It can be anticipated what happens if the driver forgets to select the program assigned to the actual road conditions. In order to increase the driving stability of vehicles, in addition to the already mentioned wheel slip control, all-wheel drive and antilocking brake systems are also known. However, all these devices cannot keep a vehicle in all cases from exceeding the limits of driving dynamics.

It is the objective of the invention to provide system with simpler means than those that are known which keep a vehicle that has entered the range of the cornering limit speed from entering into the no longer controllable, unstable range.

According to the invention, this objective is achieved by monitoring the lateral acceleration, steering angle and driving speed. The basis is a certain time sequence of the lateral acceleration and of the steering angle and the driving speed. When the vehicle, with increasing driving speed and/or with increasing steering angle, enters into the range of the cornering limit speed, the lateral acceleration suddenly will no longer increase because the tires have already made available the maximum cornering force. The vehicle starts to leave the cornering path. The driver reacts by steering, i.e., by enlarging or reducing the steering angle, according to the lay-out of the vehicle, i.e., according to an oversteering or an understeering of the vehicle.

The invention consists essentially of determining the condition "no change of the lateral acceleration despite change of the steering angle and/of the driving speed" and reacting to it by reducing the power output.

A propulsion system according to the present invention includes circuitry for determining when a predetermined change of steering angle or driving speed is not followed by a change of lateral acceleration. Whereupon the circuitry, which makes a determination activates a storage element to store the momentary value of the steering angle or driving speed. This stored steering angle or driving speed is used to create a first and second threshold to be compared in first and second comparators with the momentary values of the steering angle of driving speed. A bistable circuitry or flip-flop is set by the output signal of the first comparator and reset by the output of the output signal of the second comparator. The output signal of the bistable circuit provides a reduction signal to the reduction of driving torque which is part of a standard propulsion system. the circuitry for determining a predetermined change of steering angle or driving speed includes a differentiator for differentiating the steering angle or driving speed and a comparator for comparing differentiating signal with a predetermined threshold value. A monostable circuit prolongs the output of the comparator since the change of lateral acceleration follows by a specific time delay the monitored driving speed or steering angle. The lack of change of lateral acceleration is determined by a second differentiator with or without a low pass filter at its output and a comparator for comparing the differentiated signal with a predetermined threshold. The comparator provides an output when the differentiating signal falls below the threshold. An AND-gate determines the occurrence of the excessive rate of change of steering angle or driving speed and the lack of change of lateral acceleration to activate the storage device. An additional input to the AND-gate is from a monostable circuit which extends the output signal of the bistable circuit. A time delay circuit connects the output of the bistable circuit with its input to reset the bistable circuit after a predetermined period of time if the output signal is still present.

Other objects, advantages and novel features of the present invention will become apparent from the following detailed description of the invention when considered in conjunction with the accompanying drawings.

BRIEF DESCRIPTION OF THE DRAWING

The FIGURE is a block diagram of a propulsion control system for motor vehicles incorporating the principles of the present invention.

DETAILED DESCRIPTION OF THE DRAWING

The drawing shows a steering angle sensor 1, the output signal of which, proportionally to the respective momentary value of the steering angle, can be fed to the input 2a of a storage element 2. Upon a command at its control input 2b, stores the momentary steering angle value B and offers this value at its output 2c. As mentioned previously, driving speed may be substituted for steering angle or used therewith.

The control command at the control input 2b is the output signal of an AND-gate 3 that has three inputs 3a, b, c. A signal is fed to the input 3a that is derived from the output signal of the steering angle sensor 1 that is differentiated in a differentiator 4. The output signal of the differentiator 4 is compared with an indicated threshold value. This comparator 5 emits an output signal when the output signal of the differentiator 4 exceeds the threshold value. A monostable circuit 6 is connects behind the output of comparator 5, from its start for an indicated time period, to the first input 3a of the AND-gate 3.

Also provided is a lateral acceleration sensor 7, the output signal of which, filtered in a low-pass filter 8, is differentiated in a differentiator 9. The output signal of the differentiator 9, is compared in comparator 10 with an indicated threshold value and emits an output signal if the output signal of the differentiator 9 is below the threshold value. The output signal of the comparator 10 is fed to the second input 3b of the AND-element 3.

A gate signal, that is explained further below, is fed to the third input 3c of the AND-element 3. If all three input signals of the AND-element are H-signals, the momentary steering angle value is stored in the storage element 2. This is true when first, a certain time-related steering angle change takes place which is determined by differentiating the steering angle and subsequent comparison, and secondly, when the first differentiation of the lateral acceleration is approximately zero, which takes place by differentiating the smoothed lateral acceleration signal and subsequent comparison. Since a change of lateral acceleration always occurs in a time-delayed way, as a reaction to a steering angle or driving speed change, the monostable circuit 6 ensures that the signal "no change of lateral acceleration" can be compared with the signal "change of steering angle."

The steering angle value stored in the storage element 2 is fed via output 2c to two analog adders 11 and 12 to be added or subtracted with indicated values. The output signals of the two analog adders 11 and 12 form threshold values for two comparators 13 and 14, with which the output signal of the steering angle sensor 1 is compared. The comparator 13 emits an output signal when the output signal of the steering angle sensor 1 exceeds the first threshold value. The comparator 14, on the other hand, emits an output signal when the output signal of the steering angle sensor 1 falls below the second threshold value.

The output signals of the two comparators 13 and 14 are fed to a bistable circuit 15, a so-called RS-flipflop, the output of the comparator 13 is connected with the set input and the output of the comparator 14 is connected with the reset input.

The output signal of the bistable circuit 15, via an OR-gate 16, acts on the motor operator 17 of a power control element of the vehicle engine, shown as a throttle valve 18, in the sense of a reduction of the drive torque. This takes place via an electronic gas pedal control that is known per se and that here is outlined as the gas pedal 19 and the electronic system 20. The electronic system 20 has two outputs 20a and 20b, connected by AND-NOT gate 21 and OR-gate 16 respectively to motor operator 17. A signal at output 20a acts on the motor operator 17 in the sense of a power increase, and a signal at the output 20b, acts on the motor operator 17 in the sense of a power reduction. The output of the bistable circuit 15, which acts on the motor operator 17 in the sense of a power reduction, is connected to an inverting input of AND-NOT gate 21 and prevents a power-increasing motor operator movement by a signal at the output 20a as long as an output signal of bistable circuit 15 is preset.

A monostable circuit 22 connects the output of the bistable circuit 15 to the third input 3c of gate 3. The monostable circuit 22 provides an L-signal at its output starting at the start of the output signal of the bistable circuit 15 and for an indicated period of time. For the duration of this L-signal, the AND-gate 3 is blocked. Thus in this time period, the storage element 2 cannot store another steering angle value and therefore interferes with the occurring control process.

A time-delay element 23 connects the output of the bistable circuit 15 to its insert input via OR-gate 24. The other input to OR-gate 24, is the output of the comparator 14. By means of this safety time delay element, the bistable circuit 15 is reset when its output signal has lasted longer than an indicated time period, such as 1 second. As a result, interferences by means of which the bistable circuit is set or not cancelled are safely eliminated.

The method of operation of the system is the following: If a certain time-related steering angle change (H-signal at the input 3a), no time-related change of the lateral acceleration (H-signal at the input 3b) and when the gate signal at the input 3c is an H-signal occur simultaneously, the momentary steering angle value is stored in the storage element 2 via a control signal at the control input 2b. In the analog adder 11, for example 1° LW (degree of steering angle) is added to this stored value; in the analog adder 12, for example, 5° LW are subtracted from it. In the comparators 13 and 14, the momentary actual steering angle value is compared with these two threshold values. Assuming is an understeering vehicle, a countersteering motion of the driver will now take place when the vehicle swerves, in the sense of an enlargement of the steering angle. An output signal appears at the comparator 13 and sets the bistable circuit 15. Its output signal, via the OR-gate 16, causes an adjustment of the throttle valve 18 in the sense of a power reduction.

Subsequently, the driver can generally cancel this countersteering motion by turning the steering wheel back. In this case, there is a falling below the second threshold value producing an output signal from the comparator 14 which resets the bistable circuit 15. This terminates the power reducing adjustment of the throttle valve and it is adjusted back into a position indicated by the gas pedal 19 under the control of electronic system 20. During the power-reducing adjustment of the throttle valve 18, the AND-gate 3 is blocked so that the control process is not disturbed. However, if it lasts too long, it is terminated by the safety time delay element 23.

As already mentioned, it is possible to replace the steering angle sensor 1 by a driving speed sensor and to use the driving speed instead of the steering angle in the described way.

However, it is also conceivable to link the steering angle as well as the driving speed with one another and include them in the control.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In a propulsion control system for motor vehicles in the range of the cornering limit speed, having a means for an automatically controlled reduction of the drive torque, having a lateral acceleration sensor means and having a driving parameter sensor means for sensoring a driving parameter selected from steering angle and a driving speed, the improvement comprising:

means for determining when a predetermined change of driving parameter is not followed by a change of the lateral acceleration, storage means for storing the momentary value of the driving parameter when activated by said determining means, first and second threshold value forming means, connected in parallel to the output of the storage means, for forming a first and second threshold value respectively as a function of the stored value, a first and second comparator means for comparing the momentary value of said driving parameter with the corresponding first and second threshold value, and bistable means, that is set by the output signal of the first comparator means and is reset by the output signal of the second comparator means, for providing a reduction output signal to said means for the reduction of the drive torque.

2. A system according to claim 1, wherein said determining means includes logic means for emitting an output signal to the storage means when both a predetermined time-related driving parameter change takes place, and time-related change of the lateral acceleration falls below a certain value.

3. A system according to claim 2, wherein said logic means includes:

a differentiator means for differentiating the output signal of said driving parameter sensor means, a third comparator means for comparing the output signal of the differentiator means with an indicated threshold value and emitting an output signal when the differentiating signal exceeds the threshold value.

a monostable means for prolonging the output signal of the third comparator means for an indicated time period, as an indication of said predetermined time-related driving parameter change.

4. A system according to claim 2, wherein said logic means includes:

a second differentiator means for differentiating the output signal of the lateral acceleration sensor means, and a fourth comparator means for comparing the output signal of the second differentiator means with an indicated threshold value and emitting an output signal when the differentiated signal falls below the threshold value.

5. A system according to claim 4, including a low-pass filter means between said second differentiated means and said fourth comparator.

6. A system according to claim 2, wherein said logic means includes a second monostable means for prolonging the output signal of the bistable means for an indicated time period and said logic means emits an output signal when the prolonged bistable means output signal is present simultaneously with the time-related change of driving parameter and lateral acceleration.

7. A system according to claim 6, including a safety delay means for receiving the output signal of the bistable means and emitting an output signal when the output signal of the bistable means has not disappeared, after the expiration of an indicated safety period, to reset said bistable means.

8. A system according to claim 1, including a safety delay means for receiving the output signal of the bistable means and emitting an output signal when the output signal of the bistable means has not disappeared, after the expiration of an indicated safety period, to reset said bistable means.

* * * * *